United States Patent [19]
Reno

[11] Patent Number: 4,712,207
[45] Date of Patent: Dec. 8, 1987

[54] APPARATUS FOR ERASING INFORMATION ON A REVERSIBLE OPTICAL RECORDING MEDIUM

[75] Inventor: Charles W. Reno, Cherry Hill, N.J.

[73] Assignee: RCA Corporation, Princeton, N.J.

[21] Appl. No.: 712,678

[22] Filed: Mar. 18, 1985

[51] Int. Cl.[4] .............................................. G11B 7/00
[52] U.S. Cl. ..................................... 369/121; 369/99; 369/100; 369/112
[58] Field of Search ................... 360/59, 114; 365/106; 369/13, 99, 100, 112, 116, 118; 346/76 L; 350/420, 449, 448

[56] References Cited

U.S. PATENT DOCUMENTS

| | | | |
|---|---|---|---|
| 3,851,951 | 12/1974 | Eveleth | 350/161 |
| 4,097,895 | 6/1978 | Spong | 358/128 |
| 4,216,501 | 8/1980 | Bell | 358/128.5 |
| 4,403,318 | 9/1983 | Nagashima et al. | 369/116 X |
| 4,425,570 | 1/1984 | Bell et al. | 346/135.1 |
| 4,472,748 | 9/1984 | Kato et al. | 360/59 |

OTHER PUBLICATIONS

A. A. Latwach and B. W. Siryj, "Evaluation of Erasable Optical Recorder Materials," S.P.I.E. Conf., Washington, D.C., Jun. 6, 1983.
M. Takenaga et al., "New Optical Erasable Medium Using Tellurium Suboxide Thin Film," abstract and nine figures.

*Primary Examiner*—Robert L. Richardson
*Attorney, Agent, or Firm*—Clement A. Berard, Jr.; William H. Meise; Christopher L. Maginniss

[57] ABSTRACT

An optical system is described for use in processing information on a surface of an erasable record disc. The system decreases erasure time by forming an elongated spot from the generally circular cross section of a collimated laser beam so as to provide increased illumination time to an area recorded on the disc. The system includes a source of collimated light having a generally circular cross section, a cylindrical lens for focusing one aspect of the collimated light at a finite distance f, and a beam expander having the principal plane of its input lens at the distance f from the cylindrical lens, where the light forms a beam waist. An objective lens focuses the expanded elongated beam to a diffraction spot on the surface of the record disc. A linear actuator, such as a voice coil, responds to a control signal to position the cylindrical lens in the path of the collimated light beam for the erasing process, or out of the light path for the recording process.

14 Claims, 8 Drawing Figures

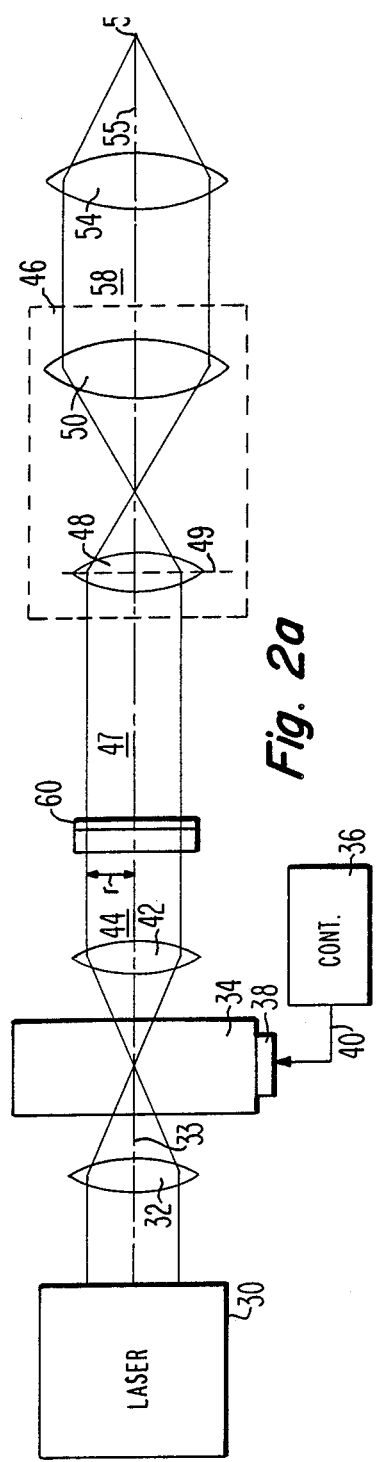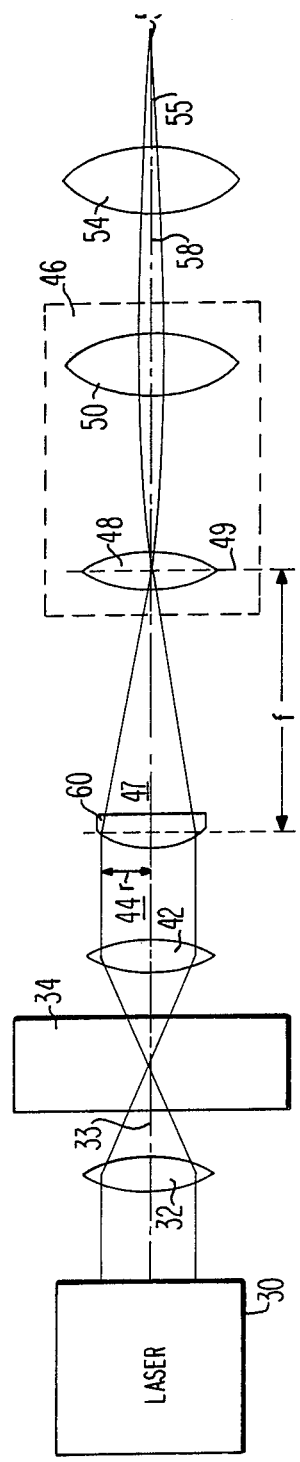
*Fig. 2a*
*Fig. 2b*

APPARATUS FOR ERASING INFORMATION ON A REVERSIBLE OPTICAL RECORDING MEDIUM

The U.S. Government has rights in this invention pursuant to a Government contract.

This invention relates generally to optical recording systems and, more particularly, to optical recording systems using erasable media and to an apparatus for reducing the time required to erase recorded areas of the media.

BACKGROUND OF THE INVENTION

Optical mass data storage systems have developed to the point where they are finding increased application to information processing systems. The advantages of the optical techniques lie in their packing density and the increased data rates with random access retrieval. The potential for improvement in optical data storage will most likely be directed toward the record medium. Although acceptable archival materials for permanent data storage have been developed, research continues to find more efficient techniques and materials to increase packing density, signal-to-noise ratio, and data rates. Nevertheless, in order for optical storage systems to provide total competition for magnetic storage systems, it will be necessary to provide an efficient erasable and reusable medium, wherein the erasing procedure does not require an unacceptably long execution time which would preclude its use in an information processing system.

Information can be recorded by exposure of a portion of an optical recording medium to a recording light beam, thereby changing the local optical properties of the exposed portion. The simplest such recording medium is a layer of a light absorptive material overlying a substrate wherein information is recorded by locally melting or ablating the absorptive layer to form a pit therein. The presence of the pit results in a change in the local transmission and/or the reflectivity of the recording medium, one of which is detected during readout of this information.

U.S. Pat. No. 4,097,895, entitled "MULTILAYERED OPTICAL RECORD", issued June 27, 1978, to F. W. Spong, disclosed an optical recording medium which comprises a light reflective layer coated with a light absorptive layer, wherein the thickness of the absorptive layer is chosen so that the reflectivity of the recording medium is reduced. U.S. Pat. No. 4,216,501, entitled "OPTICAL ANTIREFLECTIVE INFORMATION RECORD", issued Aug. 5, 1980, to A. E. Bell, disclosed a trilayer optical recording medium having a transparent spacer layer interposed between the reflective and absorptive layers of the Spong optical recording medium. This medium permits the use of a broader class of materials and a lower reflectivity recording medium or information record than that provided by the recording medium disclosed by the Spong patent.

U.S. patent application, Ser. No. 254,649, filed Apr. 16, 1981, for F. W. Spong and A. E. Bell, which is a continuation-in-part of U.S. patent application, Ser. No. 174,844, entitled "INFORMATION RECORD AND A METHOD OF REVERSIBLY RECORDING AND ERASING INFORMATION THEREON", filed Aug. 4, 1980, and now abandoned, disclosed an information record in which information can be recorded, erased and rerecorded, and which includes a capping layer overlying the absorptive layer. The capping layer inhibits, up to a maximum power, irreversible recording such as the formation of a pit in the absorptive layer, upon exposure to an information recording or information erasing light beam.

In U.S. Pat. No. 4,425,570, entitled "REVERSIBLE RECORDING MEDIUM AND INFORMATION RECORD", issued Jan. 10, 1984, to A. E. Bell and Y. Arie, there is disclosed an improved recording medium comprising an absorptive layer overlying a substrate which comprises one or more domains of a light absorbing material, which can be reversibly switched from a first state to a second state having different optical properties, embedded in a matrix effective for inhibiting an irreversible change in the optical properties of the domain material. The recording medium of the Bell et al. patent permits a range of recording beam powers which produce a reversible recording which is larger than that which was theretofore known.

Erasable optical recordings are thus made by heating a microscopic spot on the record medium to a level where its optical properties change, short of causing a rupture of the material which would form a permanent pit. The heating process changes the absorptive layer at the heated spot from a crystalline to an amorphous state. Reheating the spot at a lower temperature and for a longer time period anneals this spot, causing the amorphized spot to return to its crystalline state wherein its original optical properties are perfectly recovered.

Although recording and playback of information on an optical disc medium typically occurs as the record track makes a single pass by the optical head at a disc rotational speed of, for example, 30 revolutions per second, the annealing process used for erasure requires exposure to the reduced heat level for a far greater period of time. It can be readily seen that the spot size is of great significance in the erasing process. If the same small spot used for recording is also used for erasing, many revolutions of the disc will be required to complete the annealing process such that the recorded spot has returned entirely to its crystalline state.

Forming the erase beam into an elliptical shape provides two dimensions of improvement in the erasure process. First, the elongated spot provides longer exposure of the recorded area to the lower-energy erase power, thereby decreasing the number of exposures, or revolutions, necessary to effect complete erasure of the recorded area. Second, a slight rotation of the elliptical spot will widen the erase beam path slightly to cover at least the entire width of the track of the recorded spot so that even the edges of the spot receive erase energy on every pass.

SUMMARY OF THE INVENTION

The present invention provides an apparatus for forming an illuminating beam having an elliptical cross-section for use in decreasing the erasure time of a reversible medium optical disc.

In accordance with the principles of the present invention, there is disclosed an optical system for processing information on a surface of a record medium. The system comprises source means for providing a collimated light beam of generally circular cross-sectional shape. The system also comprises a first lens for anamorphically focusing the collimated light beam. The first lens focuses a first aspect of the cross-sectional shape at a finite distance f and focuses a second aspect orthogonal to the first aspect at an infinite distance. In addition, the system comprises a beam expander having input and output lenses, the beam expander being positioned in the path of the anamorphically focused light beam such that the first lens is at a distance f from the principal plane of the input lens. Finally, the system comprises a second lens for focusing the light beam passed by the beam expander on the surface of the record medium.

BRIEF DESCRIPTION OF THE DRAWINGS

FIGS. 2a and 2b are two orthogonal views of the optical elements of the system comprising the present invention;

DETAILED DESCRIPTION OF THE PREFERRED EMBODIMENT

Figure 1:
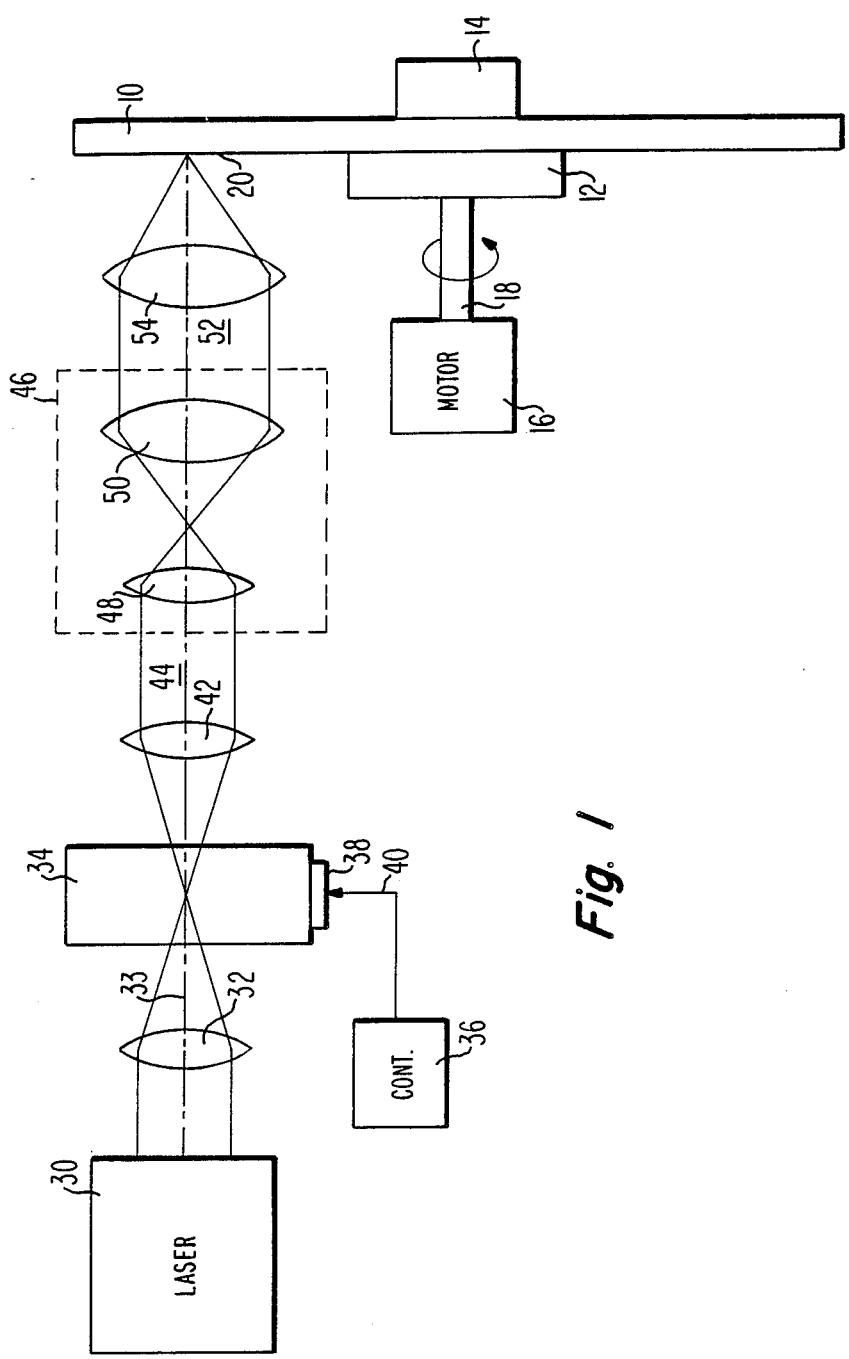
FIG. 1 is a block diagram of an optical recording system in which the present invention finds application.

Referring to FIG. 1 there is shown in block diagram form the elements of the record subsystem of a typical optical disc data storage system. Record disc 10, mounted on turntable 12 and held fixedly in position by hold down device 14, is rotated by drive motor 16 coupled via shaft 18. The depiction of hold down device 14, which may imply a clamping device, is merely functional. In practice, disc 10 may alternately be positioned on turntable 12 by a vacuum chuck. Drive motor 16 may illustratively cause disc 10 to rotate at 30 revolutions per second.

Disc 10 may be of a type described in the aforementioned Bell and Arie patent, wherein information is recorded on at least one surface 20. In accordance with one technique of reversible recording, the material of the recording layer is elevated to a temperature which causes a change of phase from crystalline to amorphous, but which is less than an ablation temperature which vaporizes or melts the recording layer forming a pit therein. With suitable modulation of the intensity of the light beam in accordance with the recording signal, as successive regions of the disc record pass through the path of the recording light beam, an information track may be formed comprising microscopic amorphous spots, in regions where the material is heated, separated by crystalline regions of the recording layer that are not subjected to exposure by the high intensity beam.

In the record mode, the monochromatic light output of laser 30 (illustratively an argon type providing an output wavelength of 488 nanometers) is focused by spherical lens 32 onto modulator 34 which may typically be of an acousto-optic type. The use of acousto-optic devices as modulators is well known and is described in U.S. Pat. No. 3,851,951, entitled "HIGH RESOLUTION LASER BEAM RECORDER WITH SELF-FOCUSING ACOUSTO-OPTIC SCANNER," issued Dec. 3, 1974, to J. H. Eveleth. The recording, or modulating, signal is generated by controller 36 and is applied to transducer 38 of acousto-optic modulator 34 via lead 40.

Spherical lens 42 recollimates the modulated record beam, and the recollimated beam 44 is directed toward beam expander telescope 46. Beam expander 46 includes input spherical lens 48 and output spherical lens 50, and expands the modulated and collimated beam 44 so that the expanded beam 52 fills the input aperture of spherical objective lens 54. Lens 54 focuses beam 52 to a substantially circular diffraction limited spot on surface 20 of rotating disc 10.

The system of FIG. 1 is useful as a recording system when the information signal generated by controller 36 modulates beam 33 such that the region on surface 20 adjacent objective lens 54 is either amorphized or permitted to remain in its crystalline state. This same system can also be used to erase information previously recorded on surface 20 of disc 10 by adjusting the signal applied to transducer 38 of modulator 34 to a constant level such that the beam focused by lens 54 heats the recorded spot with sufficient intensity to cause a return to the crystalline state. However, as was described earlier, the use of a record-size diffraction spot for erasure is a time-consuming and inefficient process.

In accordance with the present invention, the optical system of FIG. 1 can be modified as shown in FIGS. 2a and 2b for more efficiently erasing information recorded on disc 10. FIGS. 2a and 2b present two orthogonal views of the same optical system of the present invention. The elements of FIGS. 2a and 2b which are of a type described in FIG. 1 are given identical designation numerals. Anamorphic lens 60, typically a cylindrical lens, is interposed in the path of beam 44 between collimating lens 42 and beam expander 46.

Collimated beam 44 passes through the plane, or non-deflecting, aspect of cylindrical lens 60, as shown in FIG. 2a, emerging as collimated beam 47. It may be said that the plane aspect of lens 60 causes a beam passing through it to be focused at infinity. On the other hand, where beam 44 passes through the spherical aspect of cylinder lens 60, as shown in FIG. 2b, it is deflected toward a focal point at a distance f. Thus, at a distance f beyond cylindrical lens 60, beam 47 presents a profile which is collimated in one dimension and essentially reduced to a focused spot in the other dimension.

It is known, however, that a focused light beam, at its beam waist or minimum diameter, takes on the characteristic of a plane wave, i.e., it is collimated at that point. It is therefore seen that beam 47 is asymmetric and collimated in both directions at a distance f beyond cylindrical lens 60.

By locating the principal plane 49 of input lens 48 of beam expander 46 at the focal distance f from lens 60, beam expander 46 sees an asymmetrical beam which is collimated along both axes, and expands it to form an asymmetrical and collimated beam 58. Spherical objective lens 54 focuses beam 55 to an elliptical diffraction spot at point 56.

Figure 3D:
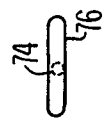
FIGS. 3a–d are views of the beam profile at several points along the system of FIGS. 2a and 2b.
Figure 3C:
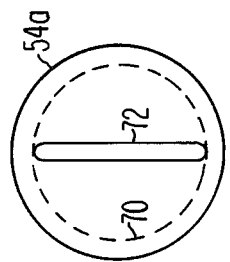
Figure 3B:
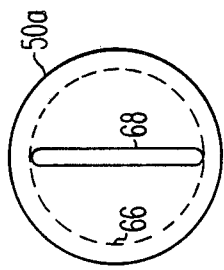
Figure 3A:
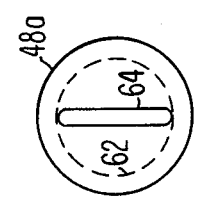

FIGS. 3a–d depict front views of the beam patterns in both the record and erase modes, for purposes of comparison, and are useful in understanding the optical systems of FIG. 1 and FIGS. 2a and 2b. FIG. 3a is a front view of a principal plane 48a of lens 48. Circular spot 62 represents the pattern of beam 44 in the record mode, while elongated spot 64 represents the pattern of beam 47 in the erase mode, which beam has been focused to a diffraction spot in one dimension.

FIG. 3b is a front view of a principal plane 50a of lens 50. Circular spot 66 represents the expanded pattern of spot 62 in the record mode, and elongated spot 68 represents the expanded pattern of spot 64 in the erase mode. FIG. 3c is a front view of a principal plane 54a of objective lens 54, and is identical to the patterns of FIG. 3b, since beams 52 and 58 are collimated along both axes in the record and erase modes.

FIG. 3d is a view of the diffraction spot focused by lens 54. Circular spot 74 is the diffraction spot used for the record process, while elongated spot 76 is the diffraction spot used in the erase process. It will be noted that the elongated dimension of spot 76 is shifted 90° with respect to spot 72. This is due to the fact that the size of a diffraction spot is inversely related to the sine function of its cone half-angle. Thus, the wide dimension of spot 72 focuses to a narrow diffraction spot and the narrow dimension of spot 72 focuses to relatively wide diffraction spot.

The ratio of the long to the short dimensions of beam 47, where it meets the principal plane 49 of lens 48, is given by $$1:2\lambda f/\pi r^2,$$

where $\lambda$ is the wavelength of the light emitted by laser 30, f is the focal length of the spherical aspect of cylindrical lens 60, and r is the radius of circular beam 44.

Assuming typical values of $\lambda=488$ nanometers, $f=75$ millimeters, and $r=0.7$ millimeters, it is seen that beam 47 is focused at plane 49 to a spot which is asymmetric by a factor of 21 to one. Thus, the elliptical diffraction spot focused by lens 54 at point 56 may typically be twenty-one times longer than it is wide. When used in an erasing process with a reversibly recorded optical disc, this spot configuration may provide greatly extended exposure of a recorded region to the erase beam intensity, thereby significantly decreasing the time required to restore a recorded bit to its original crystalline state.

It has been shown that the optical system of FIG. 1, useful in the recording process but ineffective in the erasing process, can be modified, as shown in FIGS. 2a and 2b, by the inclusion of a cylindrical lens 60 at the appropriate position with respect to beam expander 46. The similarity of the two systems suggests the use of a simple means for switching the optics between the recording function of FIG. 1 and the erasing function provided by the apparatus of FIGS. 2a and 2b.

Figure 4:
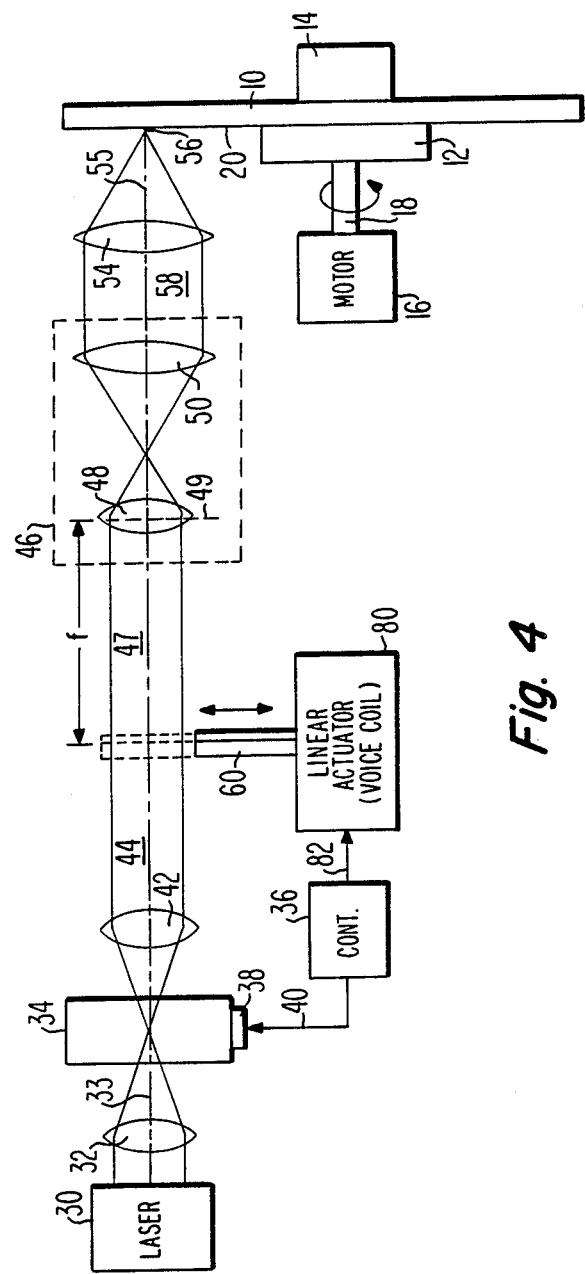
FIG. 4 illustrates means by which the optical system of FIGS. 2a and 2b may be incorporated within the recording system of FIG. 1.

Referring to FIG. 4, there is shown an apparatus for positioning cylindrical lens 60 within or out of the path of beam 44. Linear actuator 80, which may typically be a voice coil arrangement similar to those used in loudspeaker mechanisms, moves lens 60 linearly in the direction shown by the double-headed arrow. When lens 60 is placed, in response to a lens positioning control signal generated by controller 36 and applied on lead 82, in the position shown by solid lines in FIG. 4, beam 47 has a substantially circular cross-section, and is useful in the recording process. When lens 60 is moved by linear actuator 80, in response to the signal on lead 82, into the path of beam 44, as shown in FIG. 4 by the dashed lines for lens 60, beam 47 is caused to converge (in the axis normal to the page), and the optical system is useful in the erasing process.

The use of a voice coil linear actuator in this type of application is well known. See, for example, U.S. patent application, Ser. No. 426,089, "A HIGH EFFICIENCY PRECISION LASER BEAM SWITCH", filed Sept. 28, 1982, for J. T. McCann et al., in which a half-wave plate is selectively moved linearly in and out of the path of a laser beam by a voice coil linear actuator.

In the system of FIG. 4, controller 36 generates both the modulating signal on lead 40 and the cylindrical lens 60 positioning signal on lead 82. There exists a relationship between the generation of these two signals, namely, when the signal on lead 82 is such as to place lens 60 outside the path of beam 44 (lens 60 shown in solid lines), controller 36 modulates the signal on lead 40 between the record intensity level and the zero intensity level. On the other hand, when the signal on lead 82 is such as to place lens 60 within the path of beam 44 (lens 60 shown in dashed lines), controller 36 generates a constant level signal on lead 40 corresponding to the erase intensity, less than the record intensity.

As shown in FIG. 4, the orientation of lens 60 with respect to the linear motion induced by actuator 80 is such that its motion is directed along the axis of the cylinder. Thus, the travel distance of lens 60 is not a significant parameter. There are, however, four parameters related to the position of lens 60 which are critical to the operation of the present invention in its erasing fuction.

Firstly, lens 60, when extended so as to intercept the path of beam 44, must be oriented with respect to beam 44 in the direction normal to the page of FIG. 4, such that the focused aspect beam 47 impinges centrally on lens 48. Secondly, lens 60, when extended into the path of beam 44, must be positioned at the distance f from the principal plane of lens 48. Thirdly, the angular position of linear actuator 80 must be such that it extends lens 60 normal to the path of beam 44. Finally, the position of linear actuator 80 with respect to the central axis of beam 44 must be such that the asymmetric spot formed on lens 48 results in the desired position of the elliptical pattern at point 56 with respect to the track of recorded data. Adjustment of this final parameter permits a narrower or wider swath of laser exposure to a recorded region on surface 20 of rotating disc 10.

It will be noted that the four critical parameters related to the alignment of the extended position of lens 60 are all determined by the placement of linear actuator 80 and can therefore be accurately set. Advantages of the use of a voice coil as linear actuator 80 include its reliability, extended lifetime and rapid acceleration.

While the principles of the present invention have been demonstrated with particular regard to the illustrated structure of the figures, it will be recognized that various departures from such illustrative structure may be undertaken in the practice of the invention. The scope of this invention is not intended to be limited to the structure disclosed herein but should instead be gauged by the breadth of the claims which follow.

What is claimed is:

1. In an optical recording system for processing information on a surface of a record medium, said recording system including source means for providing a collimated light beam of generally circular cross-sectional shape; a beam expander positioned in the path of said collimated light beam for expanding said beam, said beam expander including input and output lenses; and an objective lens for focusing the beam passed by said beam expander to a generally circular diffraction spot on said surface of said record medium; an apparatus for elongating said generally circular diffraction spot focused on said record medium surface, said apparatus comprising:

means for anamorphically focusing a collimated light beam, said focusing means focusing a first aspect of a cross section of said collimated light beam at a finite distance f, and focusing a second aspect of said cross section orthogonal to said first aspect at an infinite distance; and means for positioning said focusing means intermediate said source means and said beam expander at a distance f from the principal plane of said input lens of said beam expander.

2. The apparatus according to claim 1 wherein said anamorphically focusing means includes a cylindrical lens.

3. The apparatus according to claim 1 wherein said positioning means includes a linear actuator.

4. The apparatus according to claim 3 wherein said linear actuator includes a voice coil.

5. An optical system for processing information on a surface of a record medium, said system comprising:
   source means for providing a collimated light beam of generally circular cross-sectional shape;
   a beam expander having input and output lenses, said beam expander positioned in the path of said collimated light beam for expanding said beam;
   an objective lens for focusing the light beam passed by said beam expander to a diffraction spot on said surface of said record medium;
   a lens for anamorphically focusing a collimated light beam passing therethrough, said anamorphically focusing lens focusing a first aspect of said collimated light beam passing therethrough at a finite distance f, and focusing a second aspect orthogonal to said first aspect at an infinite distance;
   means for generating a control signal; and
   means coupled to said generating means for positioning said anamorphically focusing lens, said positioning means positioning said anamorphically focusing lens intermediate said source means and said beam expander at a distance f from the principal plane of said input lens of said beam expander such that said collimated light beam provided by said source means passes through said anamorphically focusing lens in response to a first level of said control signal, and positions said anamorphically focusing lens away from said collimated light beam provided by said source means in response to a second level of said control signal.

6. The optical system according to claim 5 wherein said anamorphically focusing lens comprises a cylindrical lens.

7. The optical system according to claim 5 wherein said source means comprises a laser and collimating optics.

8. The optical system according to claim 7 wherein said source means further comprises means for modulating the light intensity of said laser.

9. The optical system according to claim 8 wherein said modulating means modulates said laser light to a first intensity when said generating means generates said first level of said control signal and modulates said laser light to a second intensity, greater than said first intensity, when said generating means generates said second level of said control signal.

10. The optical system according to claim 8 wherein said modulating means includes an acousto-optic modulator.

11. The optical system according to claim 5 wherein said positioning means includes a linear actuator.

12. The optical system according to claim 11 wherein said linear actuator includes a voice coil.

13. The optical system according to claim 5 further including means for imparting relative motion between said surface of said record medium and said objective lens.

14. An optical recording apparatus for optically recording data onto or erasing data from a sensitive surface of a recording medium, comprising:
   source means for providing a collimated light beams or generally circular cross-sectional shape;
   controllable modulating means including a data input terminal, said controllable modulating means being coupled for receiving said collimated light beam from said source means for modulating said collimated light beam in response to data coupled to said data input terminal to produce a controllably modulated collimated light beam of generally circular cross-sectional shape;
   controllable anamorphic focusing means including a control input terminal and an output port, said controllable anamorphic focusing means being coupled for receiving said controllably modulated collimated light beam from said controllable modulating means for selectively, in a first operating mode, passing said controllably modulated collimated light beam substantially unaffected to said output port, and in a second operating mode, focusing a first aspect of said controllably modulated collimated light beam passing therethrough at a finite distance f, and focusing a second aspect orthogonal to said first aspect at an infinite distance, for producing a selectively focussed light beam;
   beam expanding means including a lens located at said distance f from said controllable anamorphic focusing means for receiving said selectively focussed light beam from said controllable anamorphic focusing means for expanding said selectively focussed light beam to produce an expanded light beam which, in said first operating mode, is of generally circular cross-sectional shape of diameter d, and which, in said operating mode, is of generally elongated shape with a maximum dimension which is approximately equal to diameter d;
   recording medium support and translation means adapted for supporting and translating said recording medium;
   objective lens means coupled for receiving said expanded light beam from said beam expanding means for focusing said expanded light beam to a diffraction limited spot at said sensitive surface, whereby in said first operating mode an approximately circular spot is focussed upon said sensitive surface, and in said second operating mode said spot becomes elongated; and
   control means coupled to said controllable modulating means and to said controllable anamorphic focusing means for selecting one of said first and second operating modes and, in conjunction with selection of said first operating mode, coupling data to said input terminal of said controllable modulating means, whereby said approximately circular spot focussed upon said sensitive surface is modulated by data, and, in conjunction with said second operating mode, preventing the application of data to said data input terminal of said controllable modulating means, whereby said elongated spot is unmodulated.

* * * * *

UNITED STATES PATENT AND TRADEMARK OFFICE
CERTIFICATE OF CORRECTION

PATENT NO. : 4,712,207

DATED : December 8, 1987

INVENTOR(S) : Charles W. Reno

It is certified that error appears in the above-identified patent and that said Letters Patent is hereby corrected as shown below:

Column 8, line 6, "beams" should be --beam--.

Column 8, line 7, "or" should be --of--.

Column 8, line 39, after "said" insert --second--.

Signed and Sealed this

Seventeenth Day of May, 1988

Attest:

DONALD J. QUIGG

*Attesting Officer*    *Commissioner of Patents and Trademarks*